(12) United States Patent
Mansouri et al.

(10) Patent No.: US 10,597,171 B2
(45) Date of Patent: Mar. 24, 2020

(54) METHOD FOR ESTIMATING THE PLAY IN AN ELECTROMECHANICAL ACTUATOR

(71) Applicant: SAFRAN ELECTRONICS & DEFENSE, Boulogne-Billancourt (FR)

(72) Inventors: Badr Mansouri, Boulogne-Billancourt (FR); Alexandre Guyamier, Boulogne-Billancourt (FR); Jerome Piaton, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 16/095,194

(22) PCT Filed: Apr. 20, 2017

(86) PCT No.: PCT/EP2017/059447
§ 371 (c)(1),
(2) Date: Oct. 19, 2018

(87) PCT Pub. No.: WO2017/182593
PCT Pub. Date: Oct. 26, 2017

(65) Prior Publication Data
US 2019/0144135 A1    May 16, 2019

(30) Foreign Application Priority Data

Apr. 20, 2016    (FR) ..................................... 16 53497

(51) Int. Cl.
*B64F 5/60*    (2017.01)
*F16H 57/01*    (2012.01)
(Continued)

(52) U.S. Cl.
CPC ............... *B64F 5/60* (2017.01); *B64C 13/50* (2013.01); *B64D 45/00* (2013.01); *F16D 66/02* (2013.01);
(Continued)

(58) Field of Classification Search
CPC .......... B64F 5/60; F16D 66/021; F16D 66/02; B64D 45/00; B64D 2045/0085;
(Continued)

(56) References Cited

FOREIGN PATENT DOCUMENTS

FR    2 940 430 A1    6/2010

OTHER PUBLICATIONS

Joonas Sainio, "Backlash compensation in electric vehicle powertrain", Master's Thesis Espoo, Apr. 18, 2016, 121 pages.
(Continued)

*Primary Examiner* — Nadeem Odeh
*Assistant Examiner* — Michael V Kerrigan
(74) *Attorney, Agent, or Firm* — Sughrue Mion, PLLC

(57) ABSTRACT

A method is provided for characterizing the amplitude of play in an electromechanical actuator comprising an electric motor, a movable element, an upstream sensor, a downstream sensor, and a force sensor. The method includes steps of measuring the position of the motor, the position of the movable element and the load applied to the movable element using the three sensors. On the basis of a computer model of the actuator and of the measurements, a value of the amount of mechanical play is estimated using a state observer considering the play to be a state component. The amplitude of the play is determined from a set of values of the dynamic variable obtained in the preceding step at various times.

9 Claims, 9 Drawing Sheets

(51) Int. Cl.
    *B64C 13/50* (2006.01)
    *G01B 21/16* (2006.01)
    *F16D 66/02* (2006.01)
    *B64D 45/00* (2006.01)

(52) U.S. Cl.
    CPC ........... *F16D 66/021* (2013.01); *F16H 57/01* (2013.01); *G01B 21/16* (2013.01); *B64D 2045/0085* (2013.01); *F16H 2057/014* (2013.01)

(58) Field of Classification Search
    CPC ......... B64C 13/50; G01B 21/16; F16H 57/01; F16H 2057/014
    See application file for complete search history.

(56) References Cited

OTHER PUBLICATIONS

Adam Lagerbrg et al., "Backlash Estimation With Application to Automotive Powertrains", IEEE Transactions on Control Systems Technology, IEEE Service Center, May 2007, pp. 483-493, vol. 15, No. 3.
French Preliminary Search Report for FR 1653497, dated Sep. 7, 2016.
International Search Report for PCT/EP2017/059447, dated Jul. 11, 2017.

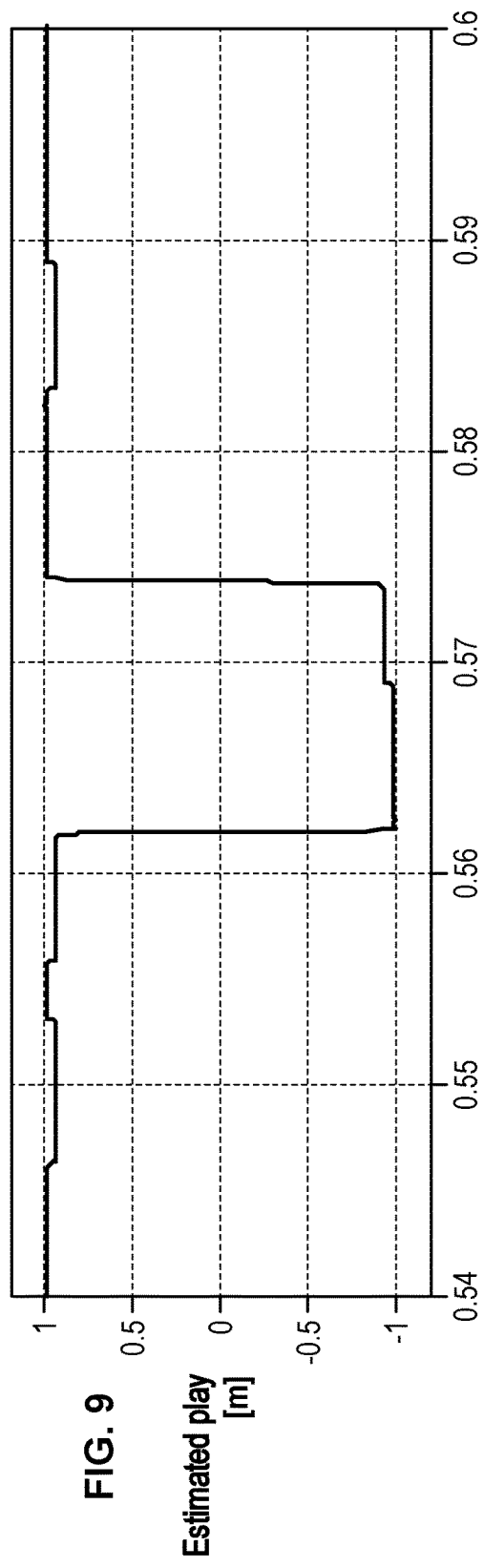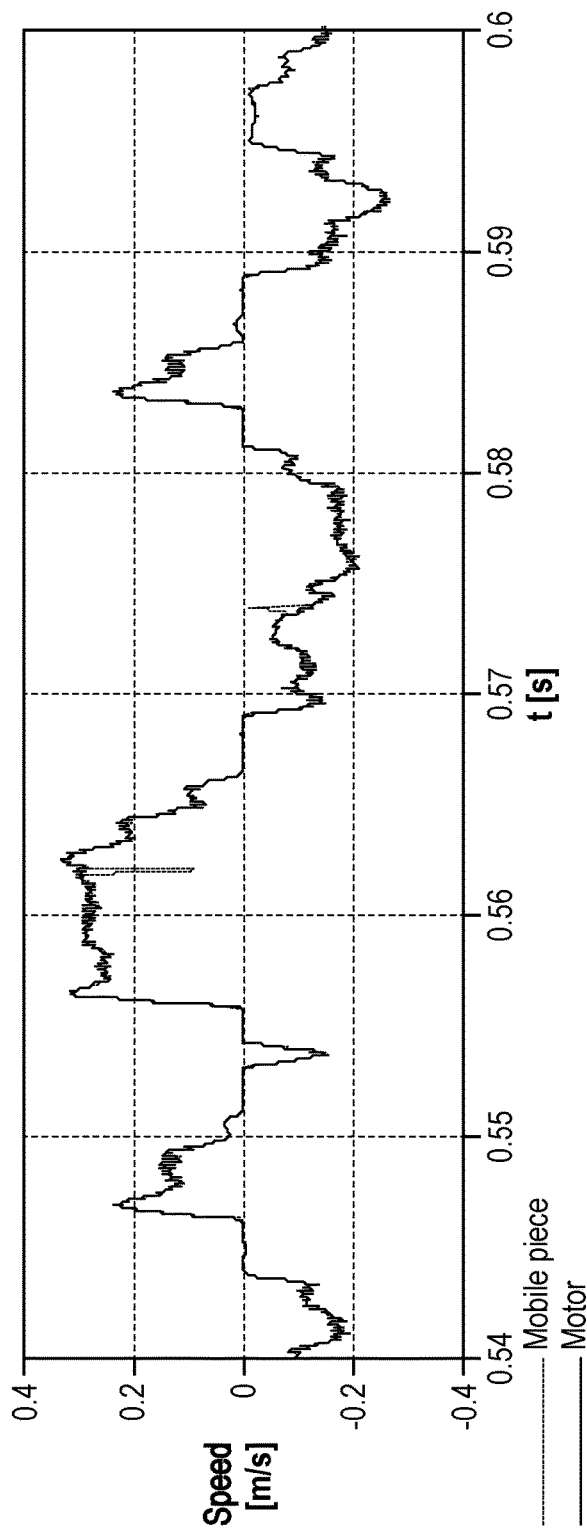
FIG. 9

METHOD FOR ESTIMATING THE PLAY IN AN ELECTROMECHANICAL ACTUATOR

This Application is a National Stage of International Application No. PCT/EP2017/059447 filed Apr. 20, 2017, claiming priority based on French Patent Application No. 1653497 filed Apr. 20, 2016, the entire contents of each of which are herein incorporated by reference in their entirety.

GENERAL TECHNICAL FIELD

The invention relates to the field of monitoring actuators in aircraft, and more precisely the monitoring of electromechanical actuators by means of estimation of the play (backlash) present in the actuator.

These actuators are for example intended to mechanically actuate flaps on the wings of the aircraft.

Figure 1:
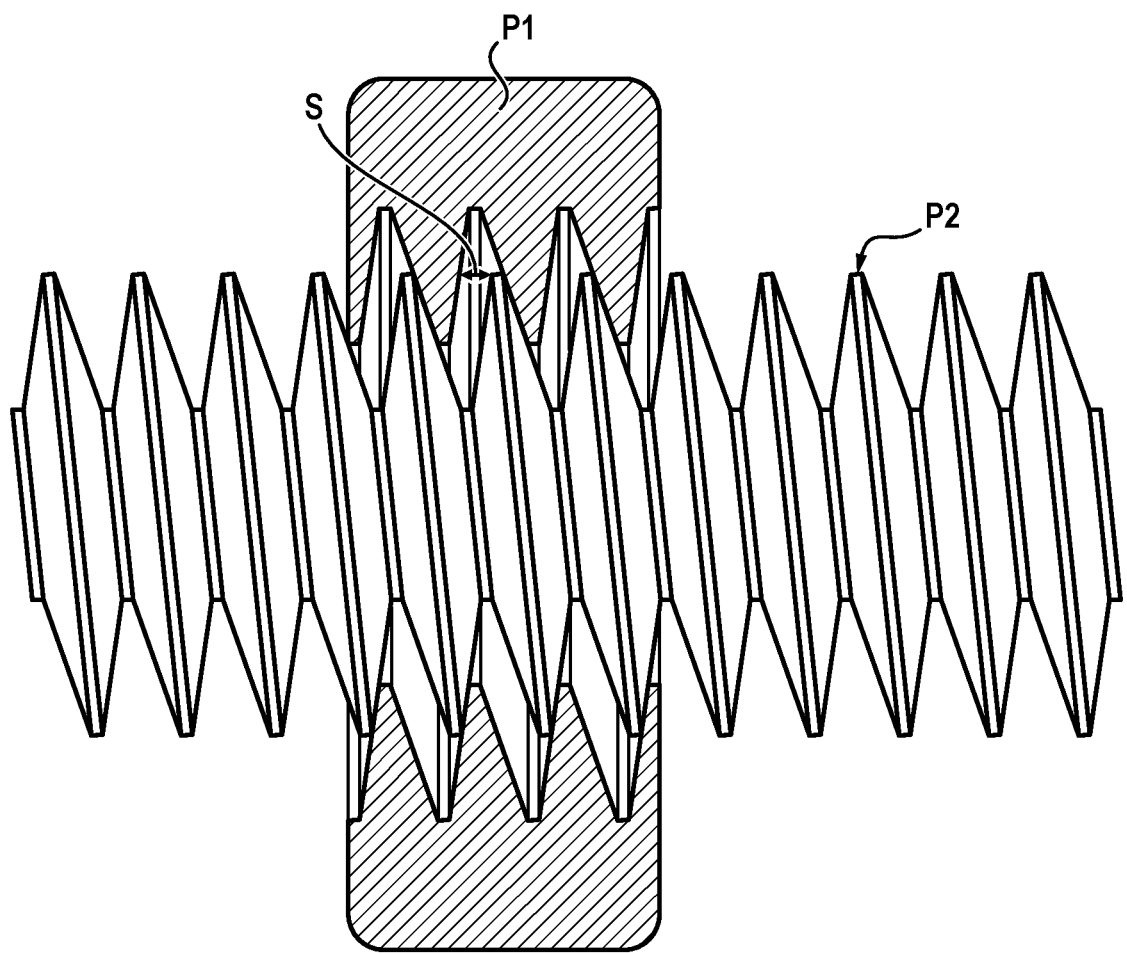

The play S specified here is a mechanical play corresponding to the distance or the angle which a piece P1 of a mechanical system has to travel before it can transmit a movement or a stress to another piece P2 of said system (see FIG. 1). This phenomenon is frequent in components of mechanical couplings, such as gearboxes, ball screws, satellite roller bearings, etc. In general, the play is experienced during reversal of the direction of operation of the actuator.

Knowing this play is necessary to improve detection of defect, and to set up diagnoses and prognoses, as used in methods of "Prognosis and Health Monitoring (PHM)".

In particular, the aim is to know the amplitude of the play, which is a constant and does not depend on the value at a given instant of the play of the actuator.

PRIOR ART

Several publications have proposed modelling and implementations of this play.

A common approach is to consider the play as a dead zone. Other approaches consider the relevant piece as elastic, such that the play is included in this elasticity.

In 2007, Lagerberg [REF NL-EKF] developed a non-linear estimator for the amplitude and the state of the play by means of the formalism of the Kalman filter, wherein the estimator considers the system as alternating between two linear modes, called "mode of contact" and "mode of play" in an absolute frame of reference. But the method is costly in terms of resources.

There is therefore no rapid and effective method for evaluating this datum.

PRESENTATION OF THE INVENTION

The invention proposes a method for characterisation of the amplitude of mechanical play of an electromechanical actuator, the electromechanical actuator comprising an electric motor and a mobile element capable of being set in motion by the motor, said play being defined as a distance or an angle which either of the motor and of the mobile element has to travel before it can transmit a movement or a stress to the other, the actuator comprising an upstream sensor suitable for measuring a position of the motor and a downstream sensor suitable for measuring a position of the mobile element, as well as a force sensor suitable for measuring a load applied to the mobile element, the method comprising steps of:

(E1) measuring the position of the motor, the position of the mobile element and the load applied to the mobile element by means of the three sensors, (E2) from computer modelling of the actuator and the measured position of the motor, of the measured position of the mobile element and of the load applied to the measured mobile element, estimation of a value of mechanical play by means of a state observer by considering the play as a component of the state, (E3) determination of the amplitude of the play from a set of values of the dynamic variable obtained at the preceding step for different instants.

The invention can comprise the following characteristics, taken singly or in combination:

the play S(t) is modelled in the form:

$$\dot{S}(t) = 0 + b(t)$$

where S is the play, b is random white noise of known spectral density, and t is the time.

one of the components of the state of the state observer is a deviation $\delta X(t)$ between the measured position of the mobile element $X2(t)$ and the measured position of the motor $X1(t)$, such that the state vector x is expressed in the following form:

$$x = [\delta X \, \dot{\delta X} \, S]^T$$

where $\delta X = X2 - X1$, and the magnitude of measured output of the state observer is expressed in the following form:

$$y = [\delta X]$$

the state observer is modelled in the following form:

$$\begin{cases} \dot{x} = Ax(t) + Bu(t) + Mw(t) \\ y(t) = Cx(t) + v(t) \end{cases}$$

w and v being respectively perturbations and measuring noise, u(t) being the command, with u(t) being equal to the load applied to the mobile element, measured by the force sensor, with $$A = \begin{bmatrix} 0 & 1 & 0 \\ \frac{-K}{m_s} & \frac{-f}{m_s} & \frac{K}{m_s} \\ 0 & 0 & 0 \end{bmatrix}$$

$$B = \begin{bmatrix} 0 & \frac{1}{m_s} & 0 \end{bmatrix}^T$$

$$M = \begin{bmatrix} 0 & 0 & 0 \\ 0 & \frac{1}{m_s} & 0 \\ 0 & 0 & 1 \end{bmatrix}$$

$$C = [1 \ 0 \ 0]^T$$

where K is a rigidity of the actuator, f a damping coefficient, $m_s$ a mass of the mobile element, the state observer is a Kalman observer, the Kalman estimator is discretized, noting $x(kT_s) = x(k)$ where $T_s$ is a sampling period, the Kalman observer is defined by the discrete state equations:

$$\dot{x}(k+1) = A_d x(k) + B_d u(k) + M_d w(k)$$

$$y(k) = C_d x(k) + v(k)$$

where $$A_d = e^{AT_s}$$

$$B_d = \int_0^{T_s} e^{Ap} B \, dp$$

$$M_d = I_n$$

$$C_d = C$$

where $I_n$ is the identity matrix.

the amplitude of the play is calculated as a deviation between an average of the maximal values of the estimated play and an average of the minimal values of the estimated play from among the set of values of the play, the amplitude of the play $\Delta S$ is calculated as follows:

$$\Delta S = \sum_{k=1}^{p} \frac{S_p(k)}{p} - \sum_{k=1}^{n} \frac{S_n(k)}{n}$$

where $$S_p(k) = \left\{ S(k)/S(k) \geq \frac{\max[S(k)] + \min[S(k)]}{2} \right\}$$

$$S_n(k) = \left\{ S(k)/S(k) < \frac{\max[S(k)] + \min[S(k)]}{2} \right\}$$

the actuator is mounted on an aircraft and wherein the measuring step (E1) is conducted in flight with an operational profile.

The invention also relates to a monitoring unit for characterizing the amplitude of play of an electromechanical actuator, the electromechanical actuator comprising an electric motor and a mobile element suitable for being set in motion by the motor, said play being defined as a distance or an angle which either of the motor and of the mobile element has to travel before it can transmit a movement or a stress to the other, the actuator comprising an upstream sensor suitable for measuring a position of the motor and a downstream sensor suitable for measuring a position of the mobile element, as well as a force sensor suitable for measuring a load applied to the mobile element, the unit being configured to:

from computer modelling of the actuator and of the measured position of the motor, of the measured position of the mobile element and of the load applied to the measured mobile element, estimate a value of the play by means of a state observer by considering the play as a component of the state of the system, determine amplitude of the play from a set of values of the play obtained at the preceding step for different instants.

The invention also relates to an electromechanical actuator and associated monitoring unit, the monitoring unit being according to what is described previously.

PRESENTATION OF FIGURES

Figure 2:
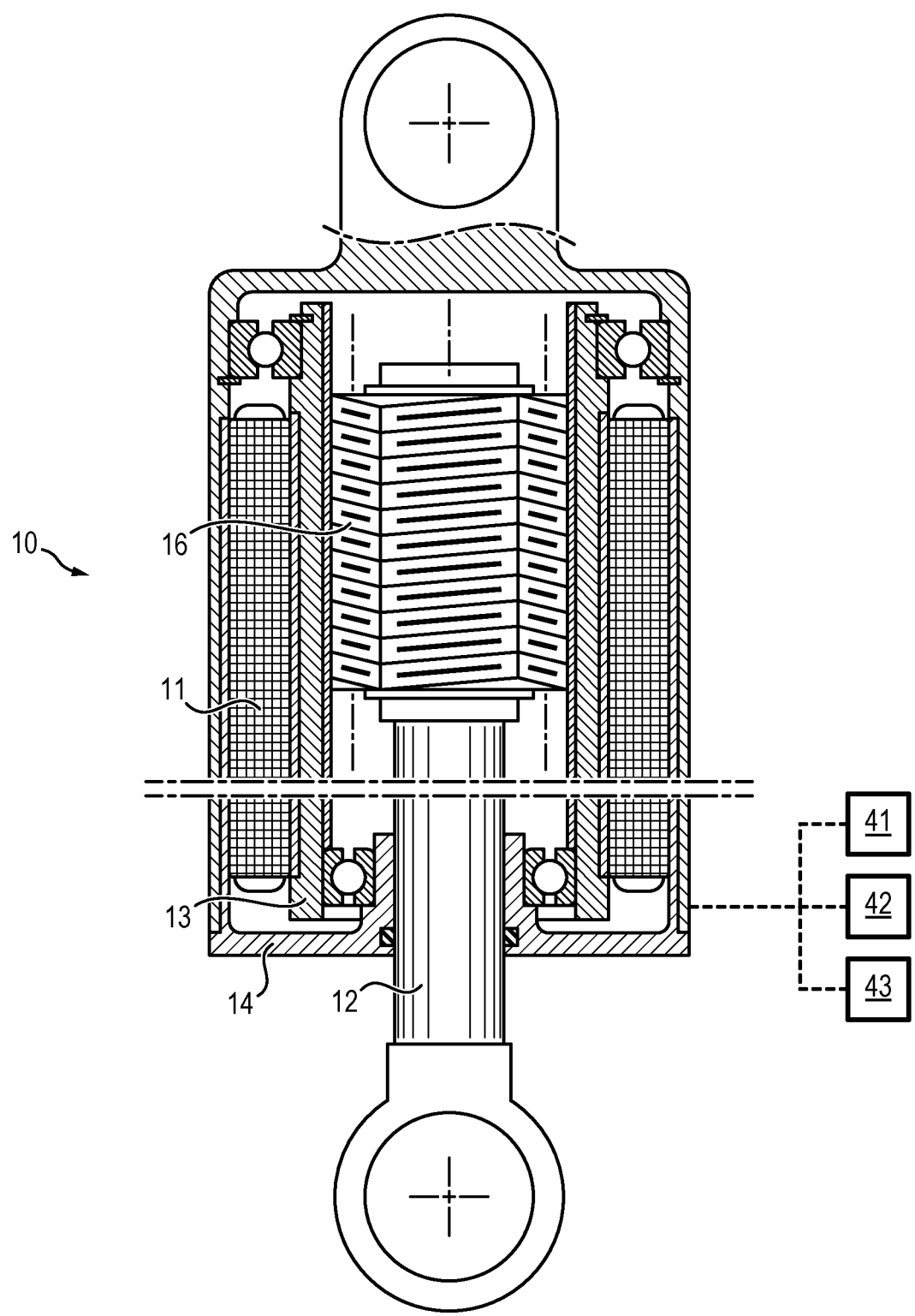
Figure 3:
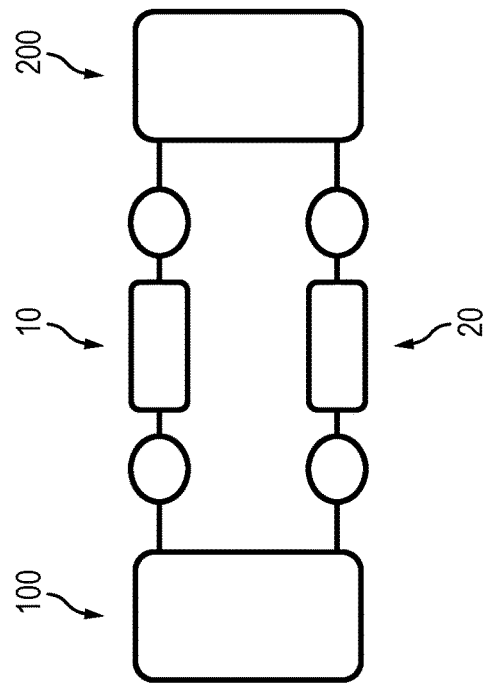
Figure 4:
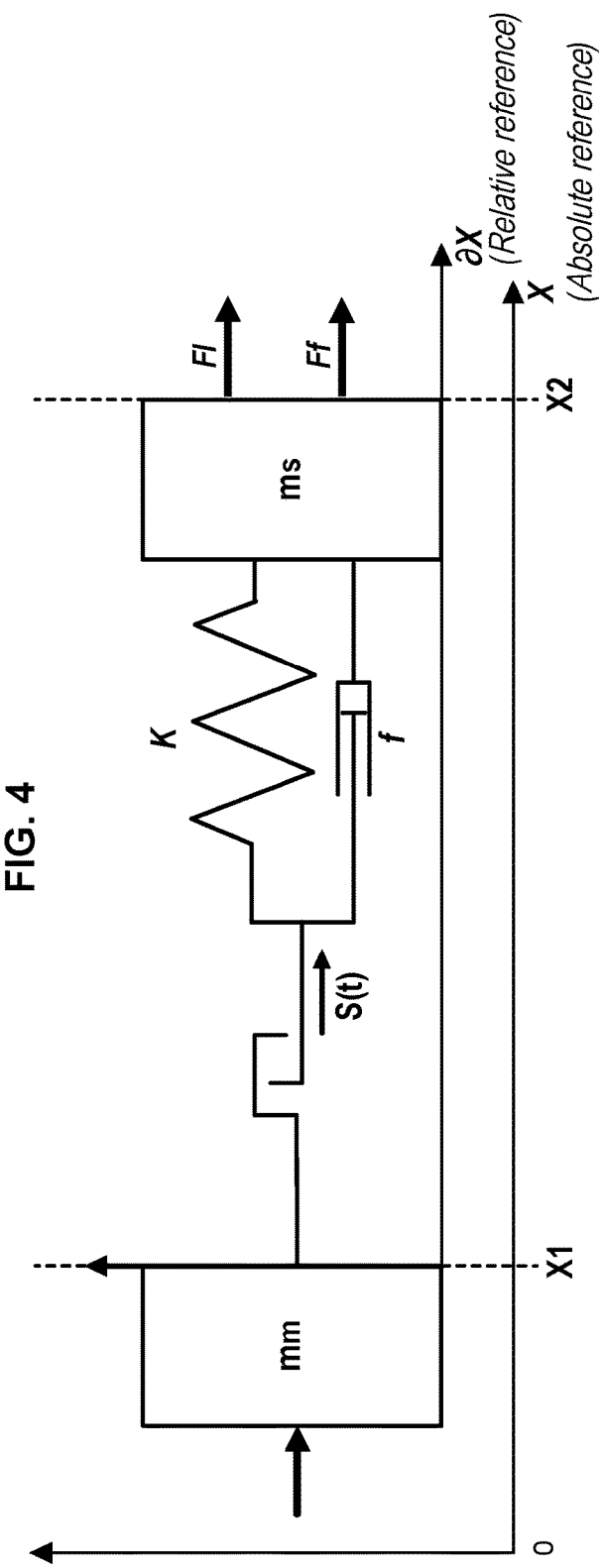
Figure 5:
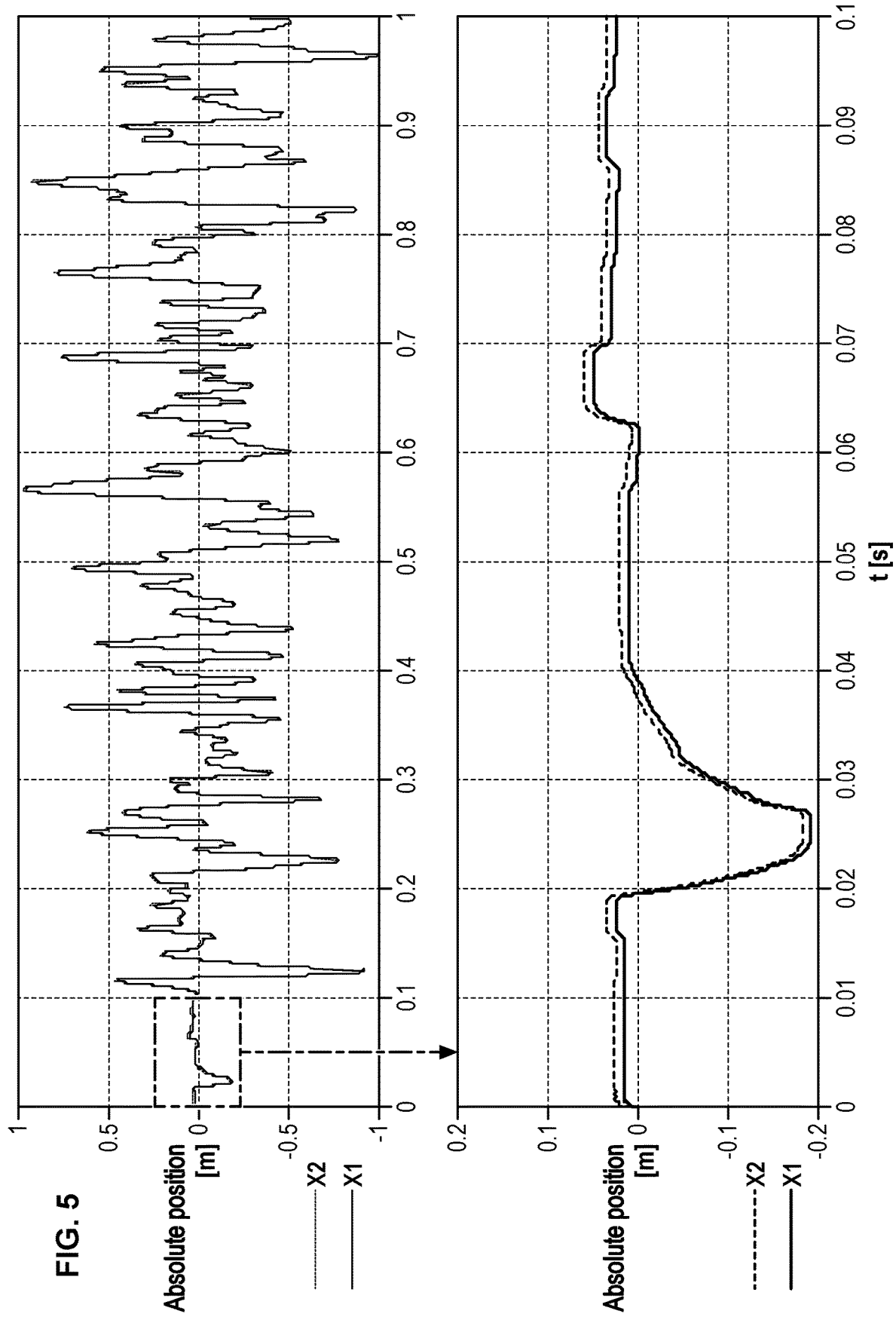
Figure 6:
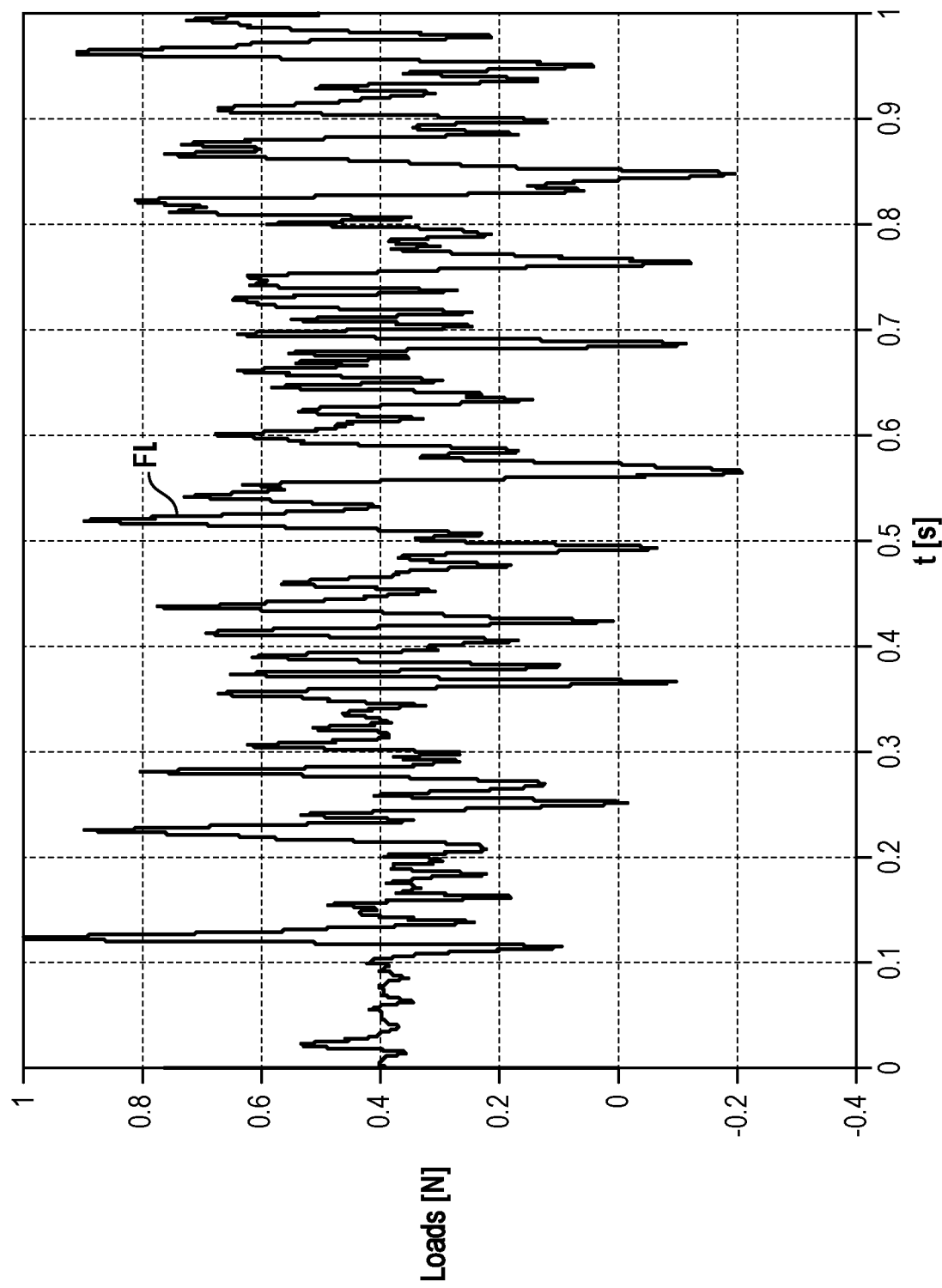
Figure 7:
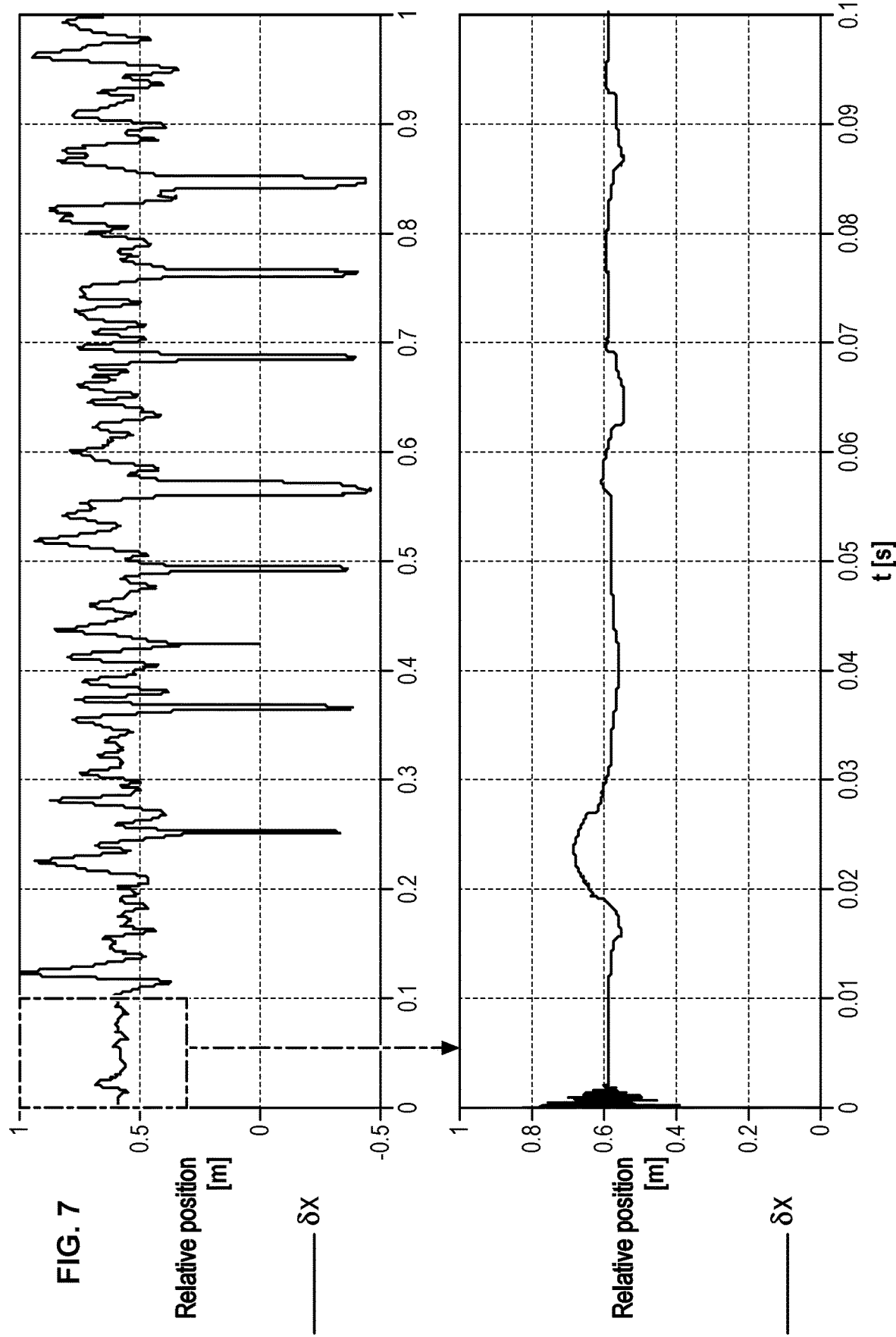
Figure 8:
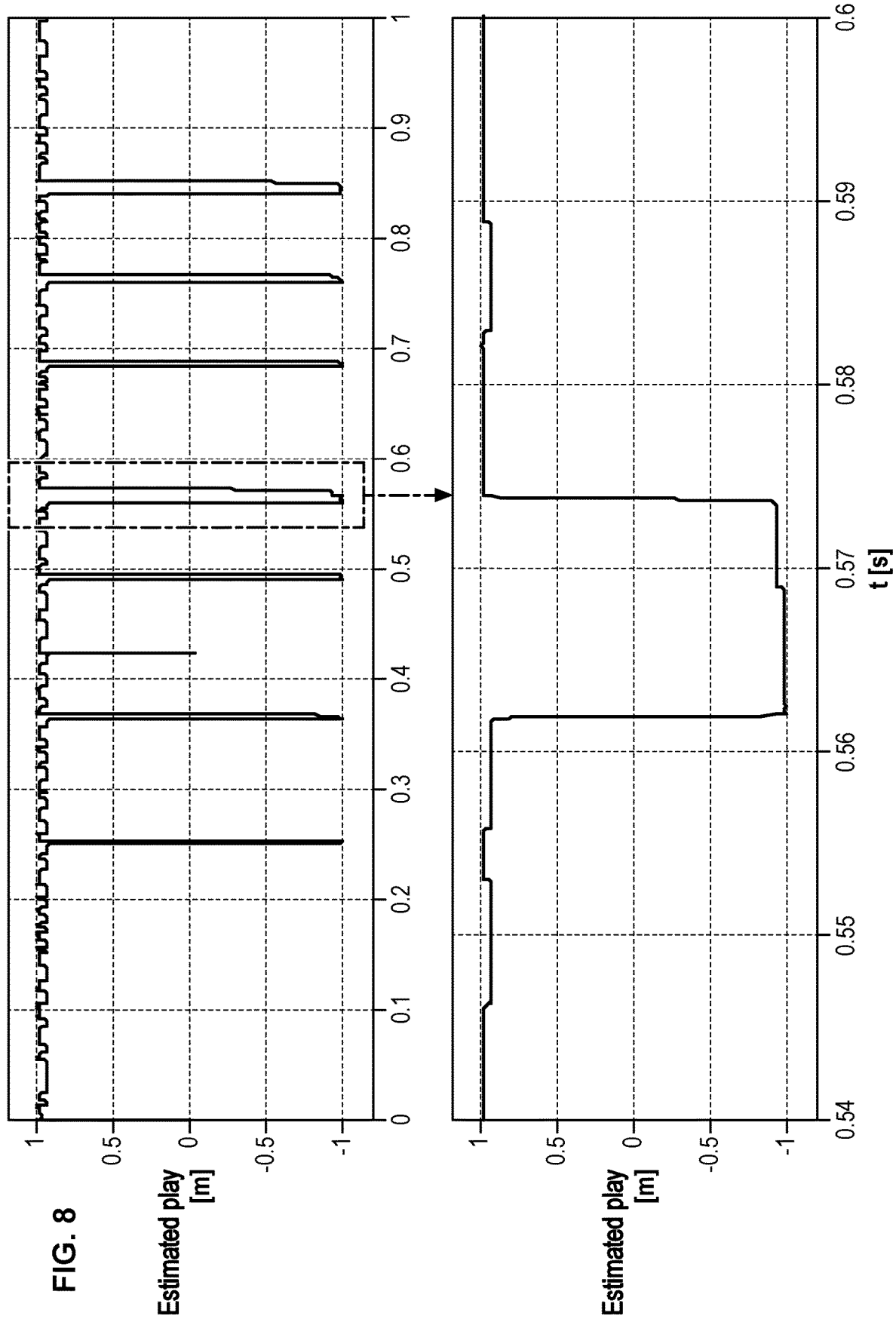
Figure 10:
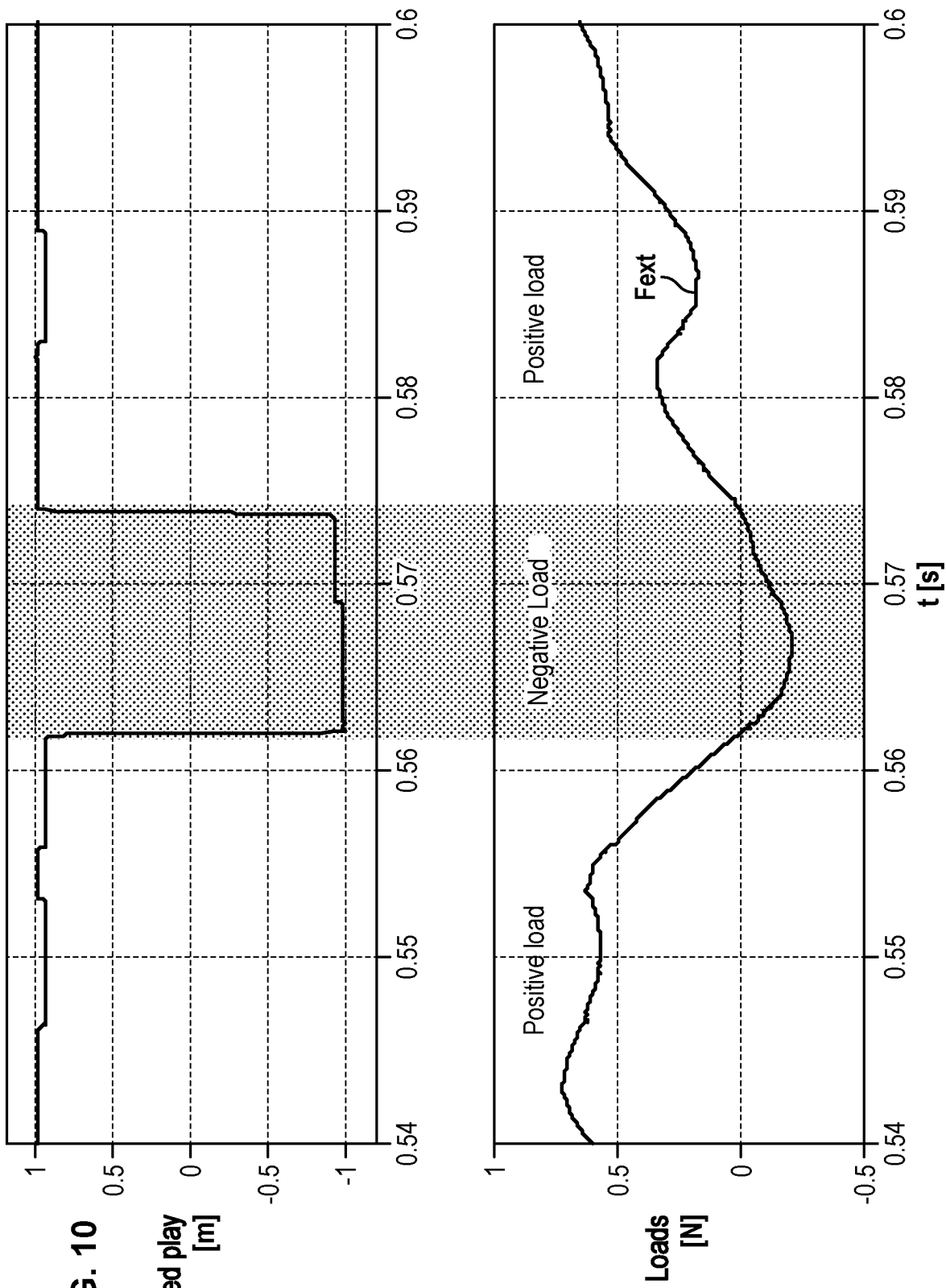

Other characteristics, aims and advantages of the invention will emerge from the following description which is purely illustrative and non-limiting, and which must be considered with respect to the appended drawings, in which:

FIG. 1, already presented, illustrates a type of play relevant to the present description, FIG. 2 schematically illustrates an electromechanical actuator which can be characterized in terms of the invention, FIG. 3 schematically illustrates two actuators of FIG. 2 installed in parallel, according to a non-limiting embodiment, FIG. 4 schematically illustrates a model of the actuator, FIG. 5 illustrates (standardized) positions of different elements of the actuator as a function of (standardized) time, FIG. 6 illustrates a (standardized) load applied to the actuator as a function of time, FIG. 7 illustrates the relative (standardized) position between two elements of the actuator as a function of time, FIG. 8 illustrates the (standardized) value of the estimated play as a function of time, FIG. 9 illustrates the estimated play and the speed of the actuator as a function of time, FIG. 10 illustrates the estimated play and load of the actuator as a function of time.

DETAILED DESCRIPTION

A characterization method of the amplitude $\Delta S$ of a play $S(t)$ of an electromechanical actuator 10 will be described.

An example of electromechanical actuator is illustrated in FIG. 2.

The actuator 10 shown is a linear displacement actuator. The actuator 10 comprises a housing, a motor 11 and a mobile piece in the form of a mobile rod 12. The motor 11 comprises a stator 14 mounted fixed relative to the housing and a rotor 13 mobile in rotation relative to the stator 14. The mobile rod 12 is mobile in translation relative to the stator 14 of the motor 11, according to a direction of displacement parallel to the axis of rotation of the rotor 13. The actuator 10 also comprises a plurality of satellite rollers 16 arranged between the rotor 13 of the motor and the mobile rod 12. Rotation of the rotor 13 relative to the stator 14 causes displacement of the rod 12 in translation relative to the stator 14. To this effect, the rotor 13 comprises an internal threaded surface and the rod 12 comprises an external threaded surface. The rollers 16 present an external threaded surface with the same thread pitch as that of the rod 12, but this pitch is reversed relative to that of the rod 12. The external threaded surface of the rod 12 is suitable for cooperating with the internal threaded surface of the rotor 13 by means of the rollers 16 to convert a rotation movement of the rotor 13 into a translation movement of the rod 12.

Document WO2010072932 describes such an actuator.

Another example of an actuator relates to rotary displacement actuators, wherein the mobile piece is mobile in translation, and the rotor of the motor drives the mobile piece in rotation relative to the stator.

FIG. 3 illustrates an actuation unit of a flight control governor, comprising two electromechanical actuators 10 and 20 identical to the actuator of FIG. 2. In the present case, the two electromechanical actuators 10, 20 are arranged in parallel between a frame 100 and a governor 200. The interest in such a configuration will be explained below. In a particular embodiment, the frame 100 is a wing of an aircraft and the governor 200 is an aileron for controlling the roll movement of the aircraft: the actuators have the aileron pivot relative to the wing of the aircraft as a function of the flight phase (take-off, landing, etc.).

The link between the frame 100 is each actuator 10, 20 is typically made by means of a fixed ball and the link between the rod 11 of the actuator 10, 20 and the aileron 200 is typically made by means of a mobile ball.

Each actuator comprises:
- an upstream sensor 41, capable of measuring a position X1(t) of the motor 10, relative to a fixed frame of reference (for example the stator of the motor), the position of the motor X1 consists more precisely of the position of the rotor 13 (in radian),
- a downstream sensor 42, capable of measuring a position X2(t) of the mobile piece 12, relative to a fixed frame of reference (for example the stator of the motor),
- a force sensor 43, capable of measuring a load Fl applied to the mobile element.

This information is collected by a processing unit. The processing unit comprises a calculation unit and a memory to store the information. It is also referred to a monitoring unit to designate a processing unit configured to conduct some steps of the method.

The processing unit can comprise a computer on board the aircraft, or a computer on the ground to which data have been transmitted.

The actuator 10 is modelled by computer by means of a Mod model. it is necessary to set up an equivalent dynamic model: The rotor system coupled to a screw can be considered as a transmission chain between two inertias or two masses. In the example of the actuator in FIG. 2, the first inertia is the motor 11 and the second inertia is transformation of the mass of the mobile piece 12 according to the axis of the motor, by means of the pitch or reduction ratio r. It is thus possible to set up a position X1(t) linear to the rotor as a function of its angular position $\theta1(t)$:

$$X_1 = \theta_1 \frac{r}{2\pi}$$

The linear position is therefore an equivalent theoretical position calculated from the angular position.

This equivalence can be executed on the mobile piece in the case of a rotary movement actuator.

Initially, the model is illustrated in FIG. 4, where X is the position in the absolute frame of reference (m), f is the damping coefficient (N/(m/s)), K is the rigidity (N/m), S(t) is the play, mm is the equivalent mass of the motor (in translation) (Kg), $m_s$ is the mass of the mobile piece (kg), $F_l$ is the aerodynamic load (N), $F_f$ is the friction (N).

The inertia in translation is given by the following transformation:

$$m_m = J_m \left(\frac{r}{2\pi}\right)^{-2}$$

Where Jm is the moment of inertia.

The force sensor 43 measures the load $F_l$, but all the applied stress comprise the load and the friction:

$$F_{ext} = F_l + F_f$$

A model given by Karam [REF-KARAM] models the friction according to the following equation:

$$F_f = F_v \dot{X} + \text{sign } e(\dot{X})[F_{dry} + \eta |F_l|] \quad (1)$$

where X is the position in the absolute frame of reference, Ff the overall friction (N), Fv the viscous friction parameter (N/(m/s)), Fdry the dry friction and η the mechanical output.

Frictions comprise the friction of the motor and those of the screw.

Given the friction Ff as negligible before the load Fl, there is:

$$F_{ext} = F_l$$

The characterisation method of the amplitude ΔS of the state of the actuator 10 comprises the following steps E1 to E3.

In a first step E1, the angular position of the motor $\theta1(t)$ of the motor is measured by the upstream sensor 41. As indicated previously, attributed to this angular position $\theta1(t)$ is an equivalent linear position X1(t). In this same step, the position of the mobile element X2(t) is measured by the downstream sensor 42, and the load applied Fl(t) to the mobile element is measured by the upstream sensor 41.

These data are then retrieved by the processing unit to be processed.

FIG. 5 illustrates X1 in solid lines and X2 in dotted lines (standardized values). In the first graph of FIG. 5, the positions X1 and X2 appear to be combined due to scale: in fact, the relative deviation in X1 and X2 is small with respect to the absolute values. Yet, on a larger scale, as shown in the second graph of FIG. 5, a difference between X1 and X2 is observed.

FIG. 6 illustrates the load $F_l$ (standardized values).

To perform the second step E2, the variable considered is no longer defined in the absolute frame, but in a relative frame relative to the inertia of the motor, defined as:

$$\delta X = X_2 - X_1$$

The fundamental principle of the dynamic applied to the inertia of the mobile piece gives:

$$m_s \ddot{\delta X} = -(K+\Delta K)(X-\delta X_0 - S) - (f+\Delta f)\dot{\delta X} + F_{ext}$$

where ΔK and Δf are respectively rigidity and damping uncertainties, $\delta X_0$ is the initial deviation, which can be selected as zero.

The identification scheme of the play is based on a Kalman filter using the preceding equation. The main hypothesis consists of considering that the dynamic variable S(t) is modelled as an integral state polluted with white noise which in turn is considered an external perturbation, in the following form:

$$\dot{S}(t) = 0 + b(t)$$

where S is the play, b is random white noise of known spectral density and without bias, and t is the time.

Equating of the Kalman filter is done on the basis of a state observer, whereof the state is expressed as follows:

$$x = [\delta X \dot{\delta X} S]^T$$

and the magnitude of measured output is:

$$y = \delta X$$

The observer is modelled according to the following equations:

$$\begin{cases} \dot{x} = Ax(t) + Bu(t) + Mw(t) \\ y(t) = Cx(t) + v(t) \end{cases} \quad (5)$$

w and v being respectively perturbations and a measuring noise, u(t) being the command, with u(t) being equal to the load applied $F_{ext} = F_l$ to the mobile element, measured by the force sensor 43, with $$A = \begin{bmatrix} 0 & 1 & 0 \\ \frac{-K}{m_s} & \frac{-f}{m_s} & \frac{K}{m_s} \\ 0 & 0 & 0 \end{bmatrix}$$

$$B = \begin{bmatrix} 0 & \frac{1}{m_s} & 0 \end{bmatrix}^T$$

$$M = \begin{bmatrix} 0 & 0 & 0 \\ 0 & \frac{1}{m_s} & 0 \\ 0 & 0 & 1 \end{bmatrix}$$

$$C = [1 \; 0 \; 0]^T$$

where K is a rigidity of the actuator, f a damping coefficient, $m_s$ a mass of the mobile element.

Once the model is set up and equated, the Kalman filter must be implemented.

The estimator is discretized according to a time period Ts. The measurements are therefore sampled at Ts.

Noting:

$$x(kT_s)=x(k)$$

the discrete equations are given by $$\dot{x}(k+1)=A_d x(k)+B_d u(k)+M_d w(k)$$

$$y(k)=C_d x(k)+v(k)$$

These matrices are approximated starting out form general solutions of the continuous system given by the equation (5), and by integrating between the instants $t_0=kT_s$ and $t=(k+1)T_s$, where $$A_d=e^{AT_s}$$

$$B_d=\int_0^{T_s} e^{Ap} B\,dp$$

$$M_d=I_n$$

$$C_d=C$$

where $I_n$ is the identity matrix.

The Kalman filter is defined by two steps: the prediction step and the updating step.

The prediction step is described by the following equations:

$$\hat{x}(k+1|k)=A_d \hat{x}(k|k)+B_d u(k)$$

$$P(k+1|k)=A_d P(k|k)A_d^T+M_d W_d M_d^T$$

The updating step is described by the equations following:

$$K_f(k+1)=P(k+1|k)\cdot C_d^T (C_d P(k+1|k) C_d^T + V_d)^{-1}$$

$$\hat{x}(k+1|k+1)=\hat{x}(k+1|k)+K_f(k+1)\cdot(y(k+1)-C_d \hat{x}(k+1|k)-D_d u_d(k+1))$$

$$P(k+1|k+1)=(I_n-K_f(k+1)C_d)P(k+1|k)$$

in which Wd and Vd are respectively noise covariance matrices of processing and measuring, with known spectral densities, $\hat{x}(k+1|k)$ and $\hat{x}(k+1|k+1)$ are the predictions and the estimations of covariance state. P(k+1| k+1) and P(k+1| k) are the prediction and covariance errors of the estimation error.

FIG. 7 illustrates the estimated relative position 5X, on the basis of data of positions X1, X2 and load $F_l$ shown in FIGS. 5 and 6.

The step E2 is typically conducted by means of the processing unit.

On completion of the step E2, the dynamic variable forming the play S(t) is estimated. For each time value kTs there is therefore a value of the play S(t).

The estimated play S(t) oscillates between a maximal value and a minimal value, as illustrated in FIG. 8 (standardized values between −1 and 1). The variations observed in the region of the end values are due to the load measured by the force sensor 43, which correspond in reality to the load $F_l$ and the frictions $F_f$.

The aerodynamic load defines a positive load which tends to displace the play towards the upper limit, while the dry friction, being added or subtracted as a function of the sign (see equation (1)) has the play oscillate around a given value. FIGS. 9 and 10 illustrate these situations by comparing the estimated play with both the speed and also the play with the load. FIG. 9 shows that the variations (around the maximal value) depend on the sign of the speed and FIG. 10 shows that the value of the play S(t) reverses with the load $F_l$.

It is clear that the fluctuations of the play S(t) are negligible relative to its values, which tends to demonstrate that the approximation according to which frictions $F_f$ are negligible relative to the load $F_l$ is valid.

Finally, from estimations of the play S(t), in a third step E3 the amplitude ΔS of the play S(t) is determined from a set of values estimated at the step E2.

This set preferably includes only some of the estimated values.

For example, a method for determination of amplitude can consist of taking the average value of the maximal values of the estimated play and the average value of the minimal values of the estimated play, then subtracting the two averages. This is about an amplitude of averaged "crest to crest" type.

This method is formalized as follows:

$$\Delta S = \sum_{k=1}^{p} \frac{S_p(k)}{p} - \sum_{k=1}^{n} \frac{S_n(k)}{n}$$

where $$S_p(k) = \left\{ S(k)/S(k) \geq \frac{\max[S(k)] + \min[S(k)]}{2} \right\}$$

$$S_n(k) = \left\{ S(k)/S(k) < \frac{\max[S(k)] + \min[S(k)]}{2} \right\}$$

This method has the advantage of being applicable irrespective of the setting of the upstream and downstream position sensors. In fact, because of the error in offset of these sensors, the point 0 of the mechanical play is never located at the centre of the range of play.

The aim of the step E3 is to obtain a constant data relative to the play S(t), which allows characterizing the actuator. In practice, with ageing and wear on the actuator, the amplitude ΔS tends to increase. Yet on a time scale relative to executing the method, the amplitude can be considered as a constant value representative of the state of the system over this execution period.

The step E3 is typically conducted by the processing unit. The value obtained from the amplitude ΔS is then stored in the memory.

The value of the amplitude ΔS obtained by the described method can then be used in monitoring methods of the state of an actuator tested, as component of a signature suitable for the actuator tested and which must be classified from among a set of signatures coming from a database. A high value of the amplitude ΔS can be a sign of fatigue and/or ageing of the actuator. By coupling this datum to other data characterizing the actuator, such as rigidity coefficients of the rod, damping, or even values linked to displacements of the rod, it is possible to establish classes of values relative to actuators according to different states: good state, damaged states, defect state, for example.

The described method needs acquisition of data (see step E1). This acquisition can be made during a flight with an operational profile, that is, during instants when a strain is put on the actuator by the aircraft for its flight (pitch, roll, take-off, etc.). The method can be implemented without the need for particular provision of the aircraft, which optimizes costs and man hours. When acquisition is done in flight, the method can be implemented with the use of a single actuator, since the load is applied directly by the physical effects of flight.

Alternatively, the tests can be conducted on the ground, on the tarmac or in a hangar, during a control. In this case, the embodiment of the actuators such as presented in FIG. 3 is advantageous, to the extent where the actuator 20 can be stressed to exert a load on the surface 200 while the actuator 10 is in the process of being tested.

In the case of an embedded processing unit, the steps E2 and E3 are conducted either in flight, or a posteriori. In the case of a processing unit on the ground, the steps E2 and E3 are conducted after retrieval of data from step E1.

REFERENCES

[NL-EKF]: Lagerberg, A. and Egardt, B. (2007). *Backlash Estimation With Application to Automotive Powertrains*. IEEE Transactions On Control System, Vol. 15, No. 3, May 2007.

[KARAM]: Karam, W. High-power static and dynamic force generators in electromagnetic technology. Ph.D. dissertation, University of Toulouse, 2007.

The invention claimed is:

1. A method for characterization of an amplitude (ΔS) of a play (S(t)) of an electromechanical actuator, the electromechanical actuator comprising an electric motor and a mobile element capable of being set in motion by the motor, said play (S(t)) being defined as a distance (m) or an angle (rad) which either of the motor or the mobile element has to travel through before the motor or the mobile element can cause a movement or a stress to the other of the motor or the mobile element, the actuator comprising an upstream sensor suitable for measuring a position of the motor (X1(t)) and a downstream sensor suitable for measuring a position of the mobile element (X2(t)), as well as a force sensor suitable for measuring a load applied to the mobile element (Fl(t)), the method comprising the steps of:

measuring the position of the motor (X1(t)), the position of the mobile element (X2(t)) and the load applied (Fl(t)) to the mobile element using the three upstream sensor, the downstream sensor, and the force sensor, respectively, from computer modelling of the actuator and the measured position of the motor (X1(t)), of the measured position of the mobile element (X2(t)) and of the measured load applied (Fl(t)) to the mobile element, estimating a value of play (S(t)) using a state observer by considering the play (S(t)) as a component of the state, a time derivative of the play S(t) being modelled in the form:

$$\dot{S}(t) = 0 + b(t)$$

where S is the play, b is random white noise of known spectral density, and t is time, one of the components of the state of the state observer being a deviation δX(t) between the measured position of the mobile element X2(t) and the measured position of the motor X1(t), such that a state vector x is expressed in the following form:

$$x = [\delta \dot{X} \, \delta X \, S]^T$$

where δX=X2−X1, and a magnitude of measured output of the state observer is expressed in the following form:

$$y = [\delta X]^T$$

and determining the amplitude of the play (ΔS) from a set of values of the play (S(t)) obtained at the estimating step for different instants in time (t).

2. The method according to claim 1, wherein the state observer is modelled in the following form:

$$\begin{cases} \dot{x} = Ax(t) + Bu(t) + Mw(t) \\ y(t) = Cx(t) + v(t) \end{cases}$$

w and v being respectively perturbations and a measurement noise, u(t) being a command, with u(t) being equal to the load applied to the mobile element, measured by the force sensor, with:

$$A = \begin{bmatrix} 0 & 1 & 0 \\ \frac{-K}{m_s} & \frac{-f}{m_s} & \frac{K}{m_s} \\ 0 & 0 & 0 \end{bmatrix}$$

$$B = \begin{bmatrix} 0 & \frac{1}{m_s} & 0 \end{bmatrix}^T$$

$$M = \begin{bmatrix} 0 & 0 & 0 \\ 0 & \frac{1}{m_s} & 0 \\ 0 & 0 & 1 \end{bmatrix}$$

$$C = [1 \; 0 \; 0]^T$$

where K is a rigidity of the actuator, f is a damping coefficient, and $m_s$ is a mass of the mobile element.

3. The method according to claim 1, wherein the state observer is a Kalman estimator.

4. The method according to claim 3, wherein the Kalman estimator is discretized.

5. The method according to claim 4, wherein the amplitude of the play (ΔS) is calculated as a deviation between an average of maximal values of the estimated play (S(t)) and an average of the minimal values of the estimated play (S(t)) from among a set of values of the play.

6. The method according to claim 5, wherein the amplitude of the play (ΔS) is calculated as follows:

$$\Delta S = \sum_{k=1}^{p} \frac{S_p(k)}{p} - \sum_{k=1}^{n} \frac{S_n(k)}{n}$$

where $$S_p(k) = \left\{ S(k)/S(k) \geq \frac{\max[S(k)] + \min[S(k)]}{2} \right\}$$

$$S_n(k) = \left\{ S(k)/S(k) < \frac{\max[S(k)] + \min[S(k)]}{2} \right\}$$

where n and p represent whole integer indexes for iteratively accounting for each estimated value of $S_p(k)$ and $S_n(k)$ at discrete times.

7. The method according to claim 1, wherein the actuator is mounted on an aircraft and wherein the measuring step is conducted in flight with an operational profile.

8. The method according to claim 1, wherein the amplitude of the play ($\Delta S$) is calculated as a deviation between an average of maximal values of the estimated play (S(t)) and an average of minimal values of the estimated play (S(t)) from among a set of values of the estimated play (S(t)).

9. A system comprising an electromechanical actuator and a monitoring unit for characterizing an amplitude ($\Delta S$) of play (S(t)) of the electromechanical actuator, the electromechanical actuator comprising an electric motor and a mobile element suitable for being set in motion by the motor, said play (S(t)) being defined as a distance (m) or an angle (rad) which either of the motor or the mobile element has to travel through before the motor or the mobile element can cause a movement or a stress to the other of the motor or the mobile element, the actuator comprising an upstream sensor suitable for measuring a position of the motor (X1(t)) and a downstream sensor suitable for measuring a position of the mobile element (X2(t)), as well as a force sensor suitable for measuring a load applied to the mobile element (Fl(t)), the monitoring unit being configured to:

from computer modelling of the actuator and of the measured position of the motor (X1(t)), of the measured position of the mobile element (X2(t)) and of the measured load applied (Fl(t)) to the mobile element, estimate a value of the play (S(t)) using a state observer by considering the play (S(t)) as a component of the state of the system, a time derivative of the play S(t) being modelled in the form:

$$\dot{S}(t) = 0 + b(t)$$

where S is the play, b is random white noise of known spectral density, and t is time, one of the components of the state of the state observer being a deviation δX(t) between the measured position of the mobile element X2(t) and the measured position of the motor X1(t), such that a state vector x is expressed in the following form:

$$x = [\delta X \, \dot{\delta X} \, S]^T$$

where δX=X2−X1, and a magnitude of measured output of the state observer is expressed in the following form:

$$y = [\delta X]^T$$

and determine the amplitude of the play ($\Delta S$) from a set of values of the play obtained at the estimating step for different instants in time (t).

* * * * *